United States Patent [19]
Dentel et al.

[11] Patent Number: 5,401,417
[45] Date of Patent: Mar. 28, 1995

US005401417A

[54] SELECTIVE ADSORPTION OF ORGANIC MATERIAL FROM WATER BY MODIFIED CLAYS

[75] Inventors: Steven K. Dentel; Ahmad I. Jamrah, both of Newark, Del.

[73] Assignee: University of Delaware, Newark, Del.

[21] Appl. No.: 99,896

[22] Filed: Jul. 30, 1993

[51] Int. Cl.⁶ .............................................. C02F 1/28
[52] U.S. Cl. ................................... 210/674; 210/691
[58] Field of Search ............... 210/670, 691, 908–910, 210/674

[56] References Cited

U.S. PATENT DOCUMENTS

| | | | |
|---|---|---|---|
| 4,549,966 | 10/1985 | Beall | 210/691 |
| 4,740,488 | 4/1988 | Fogler et al. | 502/84 |
| 5,075,033 | 12/1991 | Cody et al. | 252/315.2 |
| 5,130,028 | 7/1992 | Cody et al. | 210/691 |
| 5,151,155 | 9/1992 | Cody et al. | 162/5 |
| 5,268,109 | 12/1993 | Boyd | 210/691 |

OTHER PUBLICATIONS

Lee et al., Shape-selective Adsorption of Aromatic Molecules from Water by Tetramethylammonium-S-mectite, J. Chem Soc., Faraday Trans. 1, 1989, 85(9), pp. 2952–2962.

Barrer, Clay minerals as selective and shape-selective sorbents, Pure & Appl. Chem., vol. 61, No. 11, pp. 1903–1912, 1989. Printed in Great Britain.

Srinivasan et al., Use of Modified Clays for the Removal and Disposal of Chlorinated Dioxins and Other Priority Pollutants from Industrial Wastewaters. Chemosphere, vol. 18, Nos. 1–6, pp. 333–342, 1989, Printed in Great Britain.

*Primary Examiner*—Ivars Cintins
*Attorney, Agent, or Firm*—Donald W. Huntley

[57] ABSTRACT

Purification of water with clay modified by cationic surfactant permits treatment of water with multiple impurities.

10 Claims, No Drawings

SELECTIVE ADSORPTION OF ORGANIC MATERIAL FROM WATER BY MODIFIED CLAYS

BACKGROUND OF THE INVENTION

Increasingly stringent regulations and public demand for improved purification of water supplies have highlighted the need for improved water treatment technologies. Removal of certain organic substances to extremely low levels for drinking water treatment is required by the Safe Drinking Water Act 1986 Amendments. These include volatile organic chemicals (VOCs), synthetic organic chemicals (SOCs), and a wide range of disinfectant byproducts (DBPs). The maximum contaminant level for benzene, for example, is 5 Mg/l. Similarly, treatment of contaminated groundwaters and certain wastewater streams must attain extremely low levels of such organic compounds.

Current technologies available for attaining low concentrations of impurities remain expensive. One aspect of such treatment which generally increases the cost is the interference of other organics in the water, which may be present in concentrations equal to or greater than the organic substance to be removed. In natural surface or groundwaters, such interfering organics are often breakdown products of living organisms, including humic or fulvic materials. Particularly when using adsorption processes, such as those employing activated carbon, these organics are readily removed from the aqueous phase. Although these organics may be relatively harmless in many cases, they consume much of the removal capacity of these removal of the targeted organic. A need therefore exists for a process for the preferential removal of organic contaminants such as VOCs, SOCs, DBPs, and other lower molecular weight, relatively hydrophobic organics in the presence of similar or greater concentrations of organic constituents with greater molecular weight or size such as natural organic matter. In addition, the process should use components which can be chemically regenerated and reused, while the removed organics are separated for reuse or disposal.

SUMMARY OF THE INVENTION

The present invention provides a process for the selective adsorption of relatively small but undesirable quantities of primarily synthetic organic materials from water in the presence of larger quantities of natural organic matter (NOM).

Specifically, the instant invention provides, in a process for the purification of water containing
(a) synthetic organic matter and
(b) natural organic matter in a concentration of at least about 25 wt. % of the synthetic organic matter which process comprises contacting the water with a clay modified with a cationic surfactant to replace at least about 25% of the cations as measured by the exchange capacity of the clay.

DETAILED DESCRIPTION OF THE INVENTION

The process of the present invention is applicable to the treatment of water which contains up to about 100 mg/l of undesirable synthetic organic matter, and also up to about 100 mg/l of other organics, such as natural organic matter (NOM), which need not be removed from the water. The synthetic organic matter includes but is not limited to those substances classified by EPA regulations as VOCs, SOCs, and DBPs. The other organics such as NOM may be normally present in the water, and are of an average molecular weight at least four times that of the pollutant organics, and include ionizable sites such that the molecules are likely to possess some degree of electrical charge. Although the NOM is variable in origin and characteristics, it may be typified in laboratory experiments by such commercially available substances as tannic acid, fulvic acid, and humic acid.

In accordance with the present invention, the water is contacted with a clay treated with cationic surfactants. A wide variety of water-swellable clays can be used, such as montmorillonite, bentonite, hectorite, and other smectite clays.

Wyoming montmorillonite is a preferred clay-due to its availability and low cost. It is a dioctahedral smectite clay mineral with a configuration consisting of two tetrahedral sheets and one octahedral sheet. The tetravalent silicon atoms in the tetrahedral sheet are sometimes replaced by trivalent aluminum atoms, while there might be a replacement of the trivalent aluminum in the octahedral sheet by divalent atoms such as magnesium. This replacement of an atom of higher valence by one of lower valence leaves a deficit of positive charge, which is compensated for by the adsorption of cations such as $H^+$, $Na^+$, and $Ca^{+2}$ that do not easily fit in the interior of the lattice and thus stay on the layer surfaces. In aqueous solution, these cations on the surface can be easily exchanged by other cations when available in solution and hence are called exchangeable cations. The total amount of these cations can be determined, expressed in milliequivalents per 100 grams of dry clay, and is called the cation exchange capacity (CEC) of the clay.

Furthermore, these exchangeable cations are strongly hydrated in the presence of water. The hydration of these exchangeable cations bestows a hydrophilic nature to the mineral surface, resulting in a poor adsorption of the non-ionic organic compounds. The cations are replaced, therefore, by a modifying agent with more hydrophobic characteristics. In accordance with the present invention, at least about 25% of the cations are so replaced. Preferably, at least about 75% are replaced, and it is especially preferred to replace substantially 100%, both from the standpoint of performance and operating convenience.

A wide variety of cationic surfactants can be used as modifying agents for the clays. Particularly preferred cationic surfactants are quaternary ammonium salts such as alkyl ammonium compounds and alkylbenzylammonium compounds. Representative quaternary ammonium compounds include hexadecyltrimethyl ammonium (HDTMA), tetramethylammonium (TMA), hexadecyl benzyldimethylammonium (HDBDMA), and dioctyldecyldimethylammonium (DDDMA). The anions for these surfactants can vary, but are typically selected from halides. In accomplishing the modification, the modifying agent in dry salt or solution form can be added directly to the clay in aqueous slurry and at ambient room temperature. For modifying agents that are less soluble in water, use of other temperatures or addition of water-miscible organic solvents may be necessary to accomplish the modification. The clay slurry should include sufficient water to swell the clay and, if the modifying agent is added in dry form, also to solubilize this substance.

The modification of the clay is believed to occur by exchange of the positively-charged modifying agent for cations which previously occupied negatively charged sites on the clay. Although the invention has been found effective with this exchange process incomplete, preferably an amount of modifying agent is provided that will substantially enable all exchange sites to be occupied by the agent. This can be accomplished by first determining the cation exchange capacity (CEC) of the clay by any accepted method, and adding the agent in an amount slightly in excess of this CEC. This exchange process is generally observed to be rapid, but it is preferred to allow at least about 24 hours of equilibration time with moderate agitation. The modified clay can then be used in slurry form or dried for later use.

It is believed that the modifying agents create a hydrophobic zone within the aluminosilicate sheets of the clay lattice, which is cable of removing hydrophobic organic pollutants from water. The dimensions of these zones are such that larger organic molecules, particularly if they are electrically charged or otherwise more hydrophilic, tend to be excluded and do not compete with the organic pollutants for locations within these zones. Use of different modifying agents may therefore by advantageous for various applications of the invention, depending on the relative sizes of hydrophobicity of the organic pollutants and the larger NOM or other competing substances.

In carrying out selective absorption, water containing both the pollutant and natural organic matter, as exemplified by tannic acid, fulvic acid, or humic acid, is contacted with the modified clay at ambient or room temperature. Any of a variety of process configurations can be utilized. One simple method is combination of the water with the organoclay in a batch process and, following a brief equilibration period, separation of the organoclay containing the removed pollutants using sedimentation, bed filtration, membrane filtration, centrifugation, or the like. Another example of such processes consists of continuously flowing the water through a packed, fluidized, or expanded bed containing the organoclay. Such a process may include other materials in the bed as well, such as diatomaceous earth or sand.

If desired, the modified clay can be regenerated by removal of the pollutants, enabling reuse of the organoclay. If using an appropriate solvent for this purpose, the pollutant is concentrated in this solvent and may be reused or disposed of. Appropriate solvents for this purpose include water, water containing surfactant, and organic solvents. The preferred solvent is hexane.

In the following examples, which further illustrate the present invention, the materials and procedures described below were used:

ADSORBENT

Wyoming montmorillonite was obtained from the University of Missouri Source Clays Depository. Twelve grams of the clay were dispersed in one liter of distilled water and allowed to settle to remove impurities and heavy minerals. The clay was saturated with sodium by adding 1M sodium chloride to the clay suspension, missed, and centrifuged to separate the phases. The clay was then washed twice with distilled water to remove excess sodium, and was freeze-dried. The CEC of the purified clay was measured and found to be 93.0 milliequivalents per 100 grams of the dry clay. Organoclays were prepared in series of test tubes of 50 ml nominal volume, by adding 50 mg of the clay previously prepared to each tube. Cationic surfactant solution, based on the surfactants indicated below, was then added to replace 100% of the CEC. The tubes were shaken on a rotary shaker (3 RPM) for 24 hours, although preliminary kinetic studies showed that equilibrium was achieved in about six hours. Samples were filtered and washed with distilled water to remove the physically absorbed surfactants.

ADSORBATES

Tannic acid was used to simulate the competing effect of background natural organics present in natural waters. It contains both saccharide and aromatic acid components that are significant in surface waters. Tannins (the more important group) which are esters of a sugar, usually given as $C_{76}H_{53}O_{46}$. Its water content is 5.8% and the organic carbon content is 49.2–50%.

2,4,6-trichlorophenol (TCP), a synthetic organic compound, is representative of phenolic water pollutants and disinfection by-products. It has been detected in finished drinking water. Due to its appreciable solubility of 800 mg/l and low vapor pressure of 1 torr, the compound generally does not volatilize from water. Further, it is moderately acidic (pKa=5.99) and will substantially be ionized and solvated in surface waters. The value of its log octanol/water partition coefficient is 3.38.

1,2,4-trichlorobenzene (TCB): This is also a synthetic organic compound and one of the EPA priority pollutants. It is not known to occur as natural product. TCB may also be considered as representative of halogenated organic water pollutants and disinfection by-products that have been detected in groundwater and in surface waters. The value of its log octanol/water partition coefficient is approximately 4.1.

PROCEDURES

Isotherms were generated using the standard batch method; 50 ml glass tubes with Teflon-lined caps were employed. Organoclays were prepared as previously described, and the TCP, TCB, and tannic acid were added in the desired initial concentration. A constant ionic strength of 0.001M was maintained throughout the experiments using sodium nitrate. The solution pH was adjusted to the desired final pH, and in the case of controlled pH experiments, the pH was periodically checked and adjusted during the adsorption process using either HCl or NaOh. Each milligram of tannic acid per liter is equivalent to 1 mg dissolved organic carbon/l to resemble the organic carbon content of ground or surface waters containing NOM. The tubes were shaken on a rotary shaker (3 RPM) for 24 hours, and were covered by a light shield box to prevent the photo-oxidation of organics. Tubes were allowed to settle and samples were taken from the supernatant, filtered with 0.45 mm membrane filters for the analysis of TCP, TCB, or tannic acid. Final concentrations of TCP or TCB were determined using a Hewlett-Packard Gas Chromatograph with a HPl capillary column and flame ionization detector. Analysis of tannic acid was carried out using a Hewlett-Packard mass spectrophotometer with a wavelength of 276 mm.

EXAMPLES 1–12 AND COMPARATIVE EXAMPLES A–O

In Examples 1–12 and comparative Examples A–O, water was purified. Trichlorophenol was used in the presence of either zero or three milligrams per liter of NOM added as zero or six milligrams per liter of trichlorophenol (TCP). The organo-clay was modified with hexadecyltrimethylammonium (HDTMA) as the clay modifier at 100% of the clay CEC.

Because the uptake of TCP is pH-dependent, this variable was controlled at values of 5, 7, and 8. Tables 1 and 2 compare the amounts of adsorption with and without the initial NOM. Co represents the original TCP concentration, and Ce represents the final concentration of TCP in the water. These tables show that the organoclay's uptake of TCP was unaffected by presence of the NOM.

TABLE 1

HDTMA-Clay; 100% Replacement

| Comparative Example | TCP Co (mg/L) | TCP Ce (mg/L) | Adsorption (mg/g) | Final pH |
|---|---|---|---|---|
| A | 20.099 | 0 | 19.475 | 5 |
| B | 36.527 | 0 | 35.442 | 5 |
| C | 58.157 | 0 | 56.570 | 5 |
| D | 75.117 | 8.545 | 64.668 | 5 |
| E | 100 | 18.71 | 79.254 | 5 |
| F | 20.416 | 0 | 19.871 | 7 |
| G | 35.90 | 0 | 34.929 | 7 |
| H | 58.80 | 4.154 | 52.449 | 7 |
| I | 75.128 | 1.523 | 57.997 | 7 |
| J | 100 | 3.093 | 67.366 | 7 |
| K | 18.282 | 0 | 17.762 | 8 |
| L | 36.237 | 0 | 35.252 | 8 |
| M | 58.698 | 8.273 | 48.840 | 8 |
| N | 76.175 | 15.35 | 58.649 | 8 |
| O | 100 | 36.80 | 60.803 | 8 |

TABLE 2

HDTMA-Clay; 100% Replacement; 6 mg/L tannic acid

| Example | TCP Co (mg/L) | TCP Ce (mg/L) | Adsorption (mg/g) | Final pH |
|---|---|---|---|---|
| 1 | 36.77 | 0 | 36.298 | 5 |
| 2 | 60.07 | 0 | 58.306 | 5 |
| 3 | 74.37 | 8.0565 | 65.298 | 5 |
| 4 | 100 | 17.4831 | 79.975 | 5 |
| 5 | 37.658 | 0 | 36.320 | 7 |
| 6 | 59.101 | 0 | 57.022 | 7 |
| 7 | 75.160 | 10.4908 | 62.103 | 7 |
| 8 | 100 | 24.3231 | 73.357 | 7 |
| 9 | 38.075 | 0 | 36.596 | 8 |
| 10 | 58.715 | 8.8612 | 48.207 | 8 |
| 11 | 75.751 | 14.746 | 58.751 | 8 |
| 12 | 100 | 27.177 | 70.978 | 8 |

EXAMPLES 13–32 AND COMPARATIVE EXAMPLES P–S

The general procedure of the above Examples was repeated. Trichlorobenzene was used at initial concentrations from 20–28 mg/L, with the montmorillonite modified by tetramethyl ammonium (TMA), hexadecyltrimethylammonium (HDTMA), hexadecylbenzyl dimethylammonium (HDBDMA), or dioctodecyldimethyl ammonium (DDDMA) at 100% CEC replacement. Tannic acid was added to the organo-clay at concentrations from 0–50 mg/L, followed by addition of the TCB. The results are summarized in Table 3, which shows that the tannic acid did not significantly affect removal of the TCB from solution.

TABLE 3

| Example | Tannic Acid (ppm) | TCB Co (mg/L) | TCP Ce (mg/L) | Adsorption (mg/g) |
|---|---|---|---|---|

HDTMA-Clay; 100% Replacement

TABLE 3-continued

| Example | Tannic Acid (ppm) | TCB Co (mg/L) | TCP Ce (mg/L) | Adsorption (mg/g) |
|---|---|---|---|---|
| P | 0 | 24.36 | 9.43 | 15.0 |
| 13 | 10 | 24.36 | 9.85 | 15.0 |
| 14 | 20 | 24.64 | 11.1 | 13.6 |
| 15 | 30 | 24.92 | 10.1 | 14.8 |
| 16 | 40 | 24.64 | 9.78 | 14.9 |
| 17 | 50 | 25.2 | 10.5 | 14.7 |
| TMA-Clay; 100% Replacement | | | | |
| Q | 0 | 20.16 | 17.4 | 2.79 |
| 18 | 10 | 20.16 | 16.5 | 3.69 |
| 19 | 20 | 20.4 | 17.2 | 3.20 |
| 20 | 30 | 19.824 | 16.2 | 3.63 |
| 21 | 40 | 19.92 | 17.6 | 2.35 |
| 22 | 50 | 19.966 | 16.1 | 3.84 |
| HDBDMA-Clay; 100% Replacement | | | | |
| R | 0 | 24.94 | 5.79 | 19.2 |
| 23 | 10 | 25.056 | 6.43 | 18.6 |
| 24 | 20 | 25.52 | 5.91 | 19.6 |
| 25 | 30 | 25.52 | 6.90 | 18.6 |
| 26 | 40 | 25.52 | 6.9 | 18.6 |
| 27 | 50 | 25.52 | 7.38 | 18.1 |
| DDDMA-Clay; 100% Replacement | | | | |
| S | 0 | 27.9 | 5.80 | 22.3 |
| 28 | 10 | 27.9 | 4.21 | 24.0 |
| 29 | 20 | 27.9 | 4.67 | 23.2 |
| 30 | 30 | 27.9 | 4.21 | 23.7 |
| 31 | 40 | 27.9 | 4.78 | 23.1 |
| 32 | 50 | 27.59 | 4.80 | 23.0 |

EXAMPLES 33–36

Organoclay which was used for removal of TCB from water was placed in contact with a regenerating liquid, which was distilled water in Examples 33 and 34 or laboratory-grade hexane in Examples 35 and 36. Removal of the TCB was quantified by measurement of the amount of TCB removed in the regenerant liquid. Table 4 shows the amount of TCB removed when this regeneration procedure was performed, and when it was repeated two additional times. The cumulative percentage of the TCB removed is shown. With both regenerant fluids, most or all of the TCB was removed from the organoclay.

TABLE 4

| Example | Cycle | Initial Absorbed TCB (mg) | TCB Removed (mg) | Total TCB Removed (%) |
|---|---|---|---|---|
| 33 | | 0.549 | | |
| | 1 | | 0.348 | 64.0 |
| | 2 | | 0.096 | 80.9 |
| | 3 | | 0.032 | 86.7 |
| 34 | | 0.447 | | |
| | 1 | | 0.387 | 86.7 |
| | 2 | | 0.094 | 100. |
| | 3 | | 0.0 | 100. |
| 35 | | 0.701 | | |
| | 1 | | 0.649 | 92.6 |
| | 2 | | 0.028 | 96.5 |
| | 3 | | 0.0 | 100. |
| 36 | | 0.523 | | |
| | 1 | | 0.579 | 100. |
| | 2 | | 0.00 | 100. |
| | 3 | | 0.00 | 100. |

EXAMPLES 37–40

Following each of the regeneration cycles of Examples 33–36, organoclay was assayed for effectiveness in reuse as an adsorbent. In each case in which the clay was regenrated with water, the absorptive capacity, after three regeneration cycles, exceeded 90% of the original. In each case in which the clay was regenerated with hexane, the absorptive capacity, after three regeneration cycles, exceeded 100% of the original.

EXAMPLES 41–53

If the general procedure of Examples 1–12 is repeated, except that 25% of the cation exchange capacity of the clay is replaced by the cationic surfactant, similar results will be obtained, but with a reduction in uptake of synthetic organic matter.

We claim:

1. A process for the purification of water containing synthetic organic matter and natural organic matter in a concentration of at least about 25 wt. % of the synthetic organic matter which process comprises
   (A) contacting the water with a clay modified with a cationic surfactant to replace at least about 25% of the cations as measured by the cation exchange capacity of the clay;
   (B) subsequently regenerating the clay by treatment with organic solvent to remove any pollutants; and
   (C) reusing the resulting regenerated clay for the purification of water.

2. A process of claim 1 wherein the cationic surfactant is a quaternary ammonium compound.

3. A process of claim 2 wherein the clay is modified with at least one hexadecyltrimethylammonium salt.

4. A process of claim 2 wherein the clay is modified with at least one tetramethylammonium salt.

5. A process of claim 2 wherein the clay is modified with at least one hexadecylbenzyl dimethylammonium salt.

6. A process of claim 1 wherein the modified clay is a smectite.

7. A process of claim 6 wherein the clay is a montmorillonite.

8. A process of claim 6 wherein the clay is modified with at least one dioctodecyldimethyl ammonium salt.

9. A process of claim 1 wherein the natural organic matter has an average molecular weight at least about four times that of the synthetic organic matter.

10. A process of claim 1 wherein the organic solvent consists essentially of hexane.

* * * * *